(12) United States Patent
Siddiqui

(10) Patent No.: US 12,743,793 B2
(45) Date of Patent: Sep. 22, 2026

(54) CAMERA TRACKING VIA DYNAMIC PERSPECTIVES

(71) Applicant: NantStudios, LLC, Culver City, CA (US)

(72) Inventor: Matheen Siddiqui, Long Beach, CA (US)

(73) Assignee: NantStudios, LLC, Culver City, CA (US)

( * ) Notice: Subject to any disclaimer, the term of this patent is extended or adjusted under 35 U.S.C. 154(b) by 81 days.

(21) Appl. No.: 18/821,004

(22) Filed: Aug. 30, 2024

(65) Prior Publication Data

US 2024/0420347 A1 Dec. 19, 2024

Related U.S. Application Data

(63) Continuation of application No. 17/968,432, filed on Oct. 18, 2022, now Pat. No. 12,112,487.

(Continued)

(51) Int. Cl.
*G06T 7/246* (2017.01)
*G06T 7/292* (2017.01)

(Continued)

(52) U.S. Cl.
CPC .............. *G06T 7/248* (2017.01); *G06T 7/292* (2017.01); *G06T 7/74* (2017.01); *G06T 13/20* (2013.01);

(Continued)

(58) Field of Classification Search
CPC ....... G06F 3/011; G06T 19/006; G06T 19/20; G06T 15/20; G06T 7/70; G06T 19/003;

(Continued)

(56) References Cited

U.S. PATENT DOCUMENTS 10,054,796 B2 8/2018 Bickerstaff et al.
10,523,929 B2 12/2019 Watson et al.

(Continued)

FOREIGN PATENT DOCUMENTS

EP 4020973 A1 6/2022
GB 2399248 A 9/2004
WO 2019195884 A1 10/2019

OTHER PUBLICATIONS

Application No. JP2024-523146, Office Action, Mailed On May 30, 2025, 10 pages.

(Continued)

*Primary Examiner* — Xiao M Wu
*Assistant Examiner* — Scott E Sonners
(74) *Attorney, Agent, or Firm* — Kilpatrick Townsend & Stockton LLP

(57) ABSTRACT

A computer system may identify a first position of a physical camera corresponding to a first time period. The computer system may render a first virtual scene for the first time period. The system may project the first scene onto a display surface to determine a first rendered image for the first time period. The computer system may receive a first camera image of the display surface from the camera during the first time period. The system may determine a first corrected position of the camera by comparing the first rendered image to the first camera image. The system may predict a second position of the camera corresponding to a second time period. The computer system may render a second virtual scene for the second time period. The system may project the second virtual scene onto the display surface to determine a second rendered image for the second time period.

20 Claims, 10 Drawing Sheets

800

Related U.S. Application Data

(60) Provisional application No. 63/257,930, filed on Oct. 20, 2021.

(51) Int. Cl.

| | |
|---|---|
| ***G06T 7/73*** | (2017.01) |
| ***G06T 13/20*** | (2011.01) |
| ***G06T 15/20*** | (2011.01) |
| ***G06T 19/00*** | (2011.01) |
| ***H04N 5/222*** | (2006.01) |
| ***H04N 5/275*** | (2006.01) |

(52) U.S. Cl.
CPC ............ *G06T 15/20* (2013.01); *G06T 19/006* (2013.01); *H04N 5/2224* (2013.01); *G06T 2207/30244* (2013.01); *H04N 5/275* (2013.01)

(58) Field of Classification Search
CPC ........... G06T 7/73; G06T 19/00; G06T 13/40; G06T 17/00; G06T 2207/10016; G06T 15/205; G06T 11/00; G06T 2207/30196; G06T 15/00; G06T 7/20; G06T 15/08; G06T 2200/04; G06T 5/50; G06T 7/194; G06T 13/20; G06T 2200/08; G06T 7/80; G06T 2213/08; G06T 13/00; G06T 3/08; G06T 7/00; A63F 2300/8082
See application file for complete search history.

(56) References Cited

U.S. PATENT DOCUMENTS

| | | | | |
|---|---|---|---|---|
| 10,664,518 | B2 | 5/2020 | McKinnon et al. | |
| 2005/0099603 | A1* | 5/2005 | Thomas | H04N 23/90 348/E5.022 |
| 2013/0182225 | A1* | 7/2013 | Stout | G03B 15/10 352/89 |
| 2015/0016680 | A1 | 1/2015 | Mack et al. | |
| 2015/0350628 | A1* | 12/2015 | Sanders | G06F 3/011 345/419 |
| 2019/0272646 | A1 | 9/2019 | Wnuk | |
| 2019/0318195 | A1 | 10/2019 | Song et al. | |
| 2021/0027084 | A1 | 1/2021 | Wnuk et al. | |
| 2022/0201163 | A1* | 6/2022 | Ukas-Bradley | G06F 3/014 |

OTHER PUBLICATIONS

U.S. Appl. No. 17/968,432, "Corrected Notice of Allowability", Jul. 23, 2024, 2 pages.
U.S. Appl. No. 17/968,432, "Notice of Allowance", Jul. 11, 2024, 10 pages.
PCT/US2022/047002, "International Preliminary Report on Patentability", May 2, 2024, 6 pages.
PCT/US2022/047002, "International Search Report and Written Opinion", Feb. 16, 2023, 7 pages.
Application No. JP2024-523146, Notice of Decision to Grant, Mailed On Sep. 5, 2025, 5 pages.
Application No. EP22884348.8, Extended European Search Report, Mailed On Jul. 10, 2025, 9 pages.

* cited by examiner

CAMERA TRACKING VIA DYNAMIC PERSPECTIVES

CROSS-REFERENCE TO RELATED APPLICATIONS

This application is a Continuation of U.S. application Ser. No. 17/968,432, filed on Oct. 18, 2022, entitled "CAMERA TRACKING VIA DYNAMIC PERSPECTIVES," which claims the benefit and priority of U.S. Provisional Application No. 63/257,930, filed on Oct. 20, 2021, entitled "CAMERA TRACKING VIA DYNAMIC PERSPECTIVES," which are incorporated by reference herein in their entirety for all purposes.

BACKGROUND

In one production technique, a digital screen can be used as a backdrop of a physical scene that is filmed. The large digital screen allows for any background and characters to be inserted with live action actors. The specific images displayed on the screen can change over time and by synchronized with the physical production camera. Images are displayed on the screen based on a determined position, e.g., using markers on the physical production camera and a separate device that determines the position for the physical production camera using the markers. Such tracking can be problematic on a crowded stage and can have errors.

BRIEF SUMMARY

Embodiments can use captured images of a display panel to determine a physical camera's location. The panels can display images that are rendered based on the physical camera's predicted location. If the display panel geometry and the rendered images are known, the physical camera's position can be determined through a comparison of the rendered image to an image captured by the physical camera. If the physical camera is in the predicted location, the captured image should mirror the rendered image and differences between the two images can be used to calculate the physical camera's actual location.

In some embodiments, the techniques for implementing camera tracking in a virtual production environment can include identifying a first position of a physical camera corresponding to a first time period or point in time. The techniques can include rendering a first virtual scene for the first time period. The techniques can include projecting the first virtual scene onto a display surface to determine a first rendered image for the first time period. The projecting of the first virtual scene is consistent with the first position of the physical camera. The techniques can include receiving a first camera image of the display surface with the first image being obtained using the physical camera during the first time period. The techniques can include determining a first corrected position of the physical camera by comparing the first rendered image to the first camera image. The techniques can include predicting, using the first corrected position, a second position of the physical camera corresponding to a second time period. The techniques can include rendering a second virtual scene for the second time period. The techniques include projecting the second virtual scene onto the display surface to determine a second rendered image for the second time period. The projecting of the second virtual scene is consistent with the second position of the virtual camera.

In some embodiments, predicting the second position uses information from a predetermined choreographic file for a final video that is to be obtained.

In some embodiments, the first position of the physical camera is identified using an initial image from the physical camera of the display screen.

In some embodiments, identifying the first position of the physical camera includes: storing a model that maps images to physical positions and inputting the initial image to the model.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

DETAILED DESCRIPTION

Figure 1:
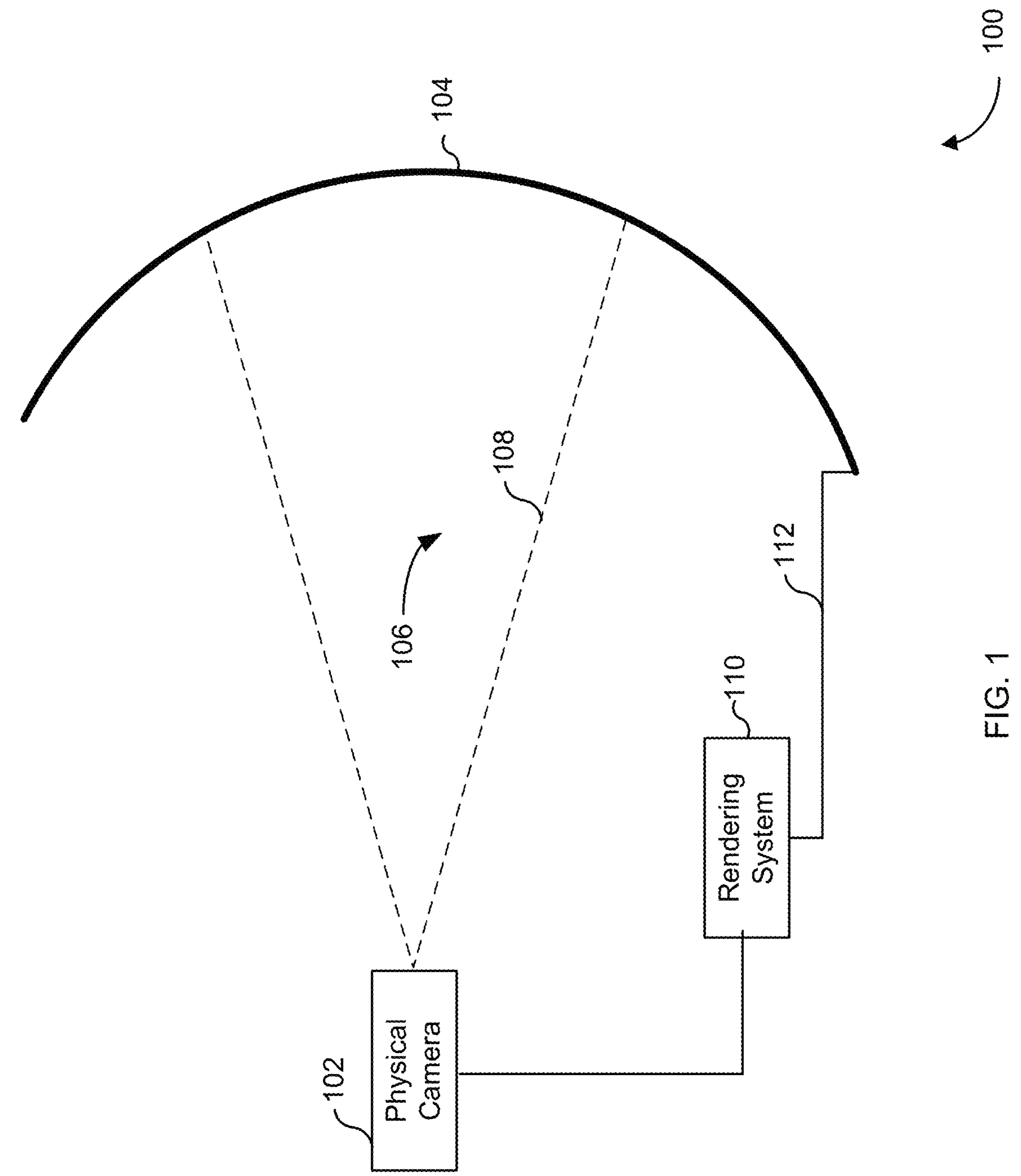
FIG. 1 shows an overhead perspective of a virtual production studio according to at least on embodiment.

Virtual production is a visual effects technique that allows for live action sequences to be shot with a physical camera in front of a computer generated environment. Filming during virtual production occurs in a large studio with a central stage surrounded (e.g., 180 degrees, 270 degrees, 4pi radians, etc.) by a display surface comprising of an array of high definition display panels. Actors and physical props are filmed in the stage while a virtual scene (e.g., computer generated backdrop) is displayed on the bordering display surface. The display surface's panels allow for realistic lighting and reflections for actors and objects in the central stage. For instance, a reflection of the virtual scene in a mirror can be captured during filming in a virtual production studio, while a similar effect with traditional film techniques can require adding the reflection in post-production.

Because the position (angle and distance) of the camera can move, the rendered image needs to be updated based on such movement. Embodiments can determine a position of the camera so as render the appropriate image for the current position of the camera. Embodiments can determined the positions without requiring a separate system that tracks the camera's movement, e.g., using markers attached to the camera. Instead, embodiments can compare the images measured by the camera to the expected images from predicted positions. Errors determined from the comparison provide information about where the camera is (e.g., an error from a predicted position at a particular time).

In this manner, the camera can be tracked with less equipment and can be more accurate than external tracking systems since the errors that result in the most visual distortion are measured with the greatest accuracy, as they are the ones that result in the largest differences between the images. Such errors would not persist in embodiment using the visual odometry since the estimated position would be updated in a manner consistent with the errors between the images.

I. Virtual Production

Virtual production is a filmmaking technique that combines live action scenes and computer generated images during filming without having to add the computer generated images in post-production. During virtual production, a computer generated three-dimensional environment is produced and the environment is used to render and show a virtual scene on a display screen bordering a central stage. The virtual scene is rendered based on an intended viewpoint, possibly relative to a camera point of view or actor point of view, so that the two-dimensional images on the display screen appear to be three-dimensional when seen from the intended viewpoint.

To accurately convey a simulated environment bordering the studio or stage, the virtual scene can be rendered for a single viewpoint. A single viewpoint is chosen because the virtual scene simulates a three-dimensional environment, but the scene is portrayed on a two-dimensional display screen. To portray a convincing three-dimensional environment on a two-dimensional screen, objects in the three-dimensional space are rendered with their relative sizes and locations determined by a viewpoint (e.g., three-dimensional (3D) projection, viewpoint of a camera, etc.). The virtual scene can be projected onto a two-dimensional plane corresponding to the viewing surface to determine the image that is to be displayed. The exact image to be displayed can depend on the position of the camera. The virtual scene can be a computer generated three dimensional environment that was created using a game engine (e.g., Unreal Engine, UnReal, etc.). The projection is an operation that maps (e.g., a geometric projection) the 3D virtual scene to the two-dimensional plane corresponding to the position of the display surface. Generally, objects appear smaller as the distance from the viewpoint increases. If the virtual scene is viewed from an unintended viewpoint, the rendered objects can appear distorted because the size, proportions, and positions of the objects is not consistent with how the objects would appear from the unintended viewpoint.

Additionally, camera movement can cause image distortions because, while the environment appears three-dimensional from a set viewpoint, there is no parallax, (e.g., the displacement of an object viewed from a changing perspective) for the two-dimensional images rendered on the display surface. To correct for the lack of parallax, a simulated parallax conveys depth by updating the computer generated images based on the physical camera's location and orientation. In order to properly simulate a parallax, the physical camera is tracked to determine the physical camera's orientation relative to the display surface.

In an illustrative example, a physical set is constructed in a central stage within the virtual production studio. A computer-generated image is provided to a rendering system within the studio that is connected to a display surface comprising an array of light emitting diode (LED) panels. In existing implementations, the studio can also contain a camera tracking system (e.g., Optitrack) that provides an initial location for the physical camera. The location, determined by the camera tracking system, is used to render a first virtual scene that is shown on the display surface. The director, after seeing the rendered scene, can make an adjustment to the lighting and position of a building in the environment. Once the director approves of the scene, actors are arranged in the stage and the scene is filmed. As a camera operator moves the camera during filming, the camera's location can be tracked through visual odometry (e.g., using visual simultaneous localization and mapping (vSLAM) or techniques where a map of the environment is known ahead of time) by comparing captured images to virtual scenes rendered for the camera's estimated position. Simultaneous localization and mapping (SLAM) can map an area while tracking the entity's location in the area. In some implementations, a map of the environment can be determined ahead of time, and new measurements can be compared to the existing 3D map. As described later, such embodiments can include using a machine learning model that has been trained in the physical environment and using the same content displayed on a screen, where such content can be dynamic.

The visual odometry can track features through successive camera frames. The comparison of features between successive frames can be used to triangulate the features' location in a three-dimensional environment. The successive camera frames can also be used to estimate the camera's pose in the three-dimensional environment. Approximate solution methods can be used and include the particle filter, extended Kalman filter, covariance intersection, and GraphSLAM.

FIG. 1 shows an overhead perspective of a virtual production studio 100 according to at least one embodiment. A physical camera 102 in front of a curved display surface 104. In some implementations, display surface 104 can border the central stage 106 and display surface 104 can include an array of display panels (e.g., light-emitting diode (LED) panels, organic light-emitting diode (OLED) panels, liquid crystal display (LCD) panels, etc.). Various geometries for the display panels are contemplated and, in some embodiments, display surface 104 can occupy a small portion of the surfaces bordering central stage 106. For example, display surface 104 can be a simulated window on a wall. In other implementations, display surface 104 can occupy up to all of the surfaces bordering central stage 106. For instance, display surface 104 can include panels on the walls, ceiling and floor bordering central stage 106 (e.g., MegaPixel). In some embodiments, display surface 104 can include panels on the ceiling or floor. Physical camera 102 can film both central stage 106 and the display surface 104. Sets, actors, and practical effects can be arranged and filmed in central stage 106.

One or more physical cameras, such as physical camera 102, can film a portion of display surface 104 defined by the camera's field of view 108. The rendering system 110 can be a computer system that generates a virtual scene using a game engine (e.g., Unreal Engine, UnReal, etc.) and the virtual scene is shown on display surface 104. Rendering system 110 can be connected to display surface 104 by a physical connection 112 or rendering system 110 can be connected to display surface 104 wirelessly. The virtual scene can be a dynamic, changing three-dimensional environment, opposed to a static image or landscape, and rendering the environment can include generating a portion of that environment that is visible from the physical camera's current position.

As will be described in more detail later, physical camera 102 can be communicably coupled with rendering system 110. In this manner, rendering system 110 can analyze the images from physical camera 102 so as to determine its current position, which can then be used to determine the image to be displayed on display surface 104.

Figure 2:
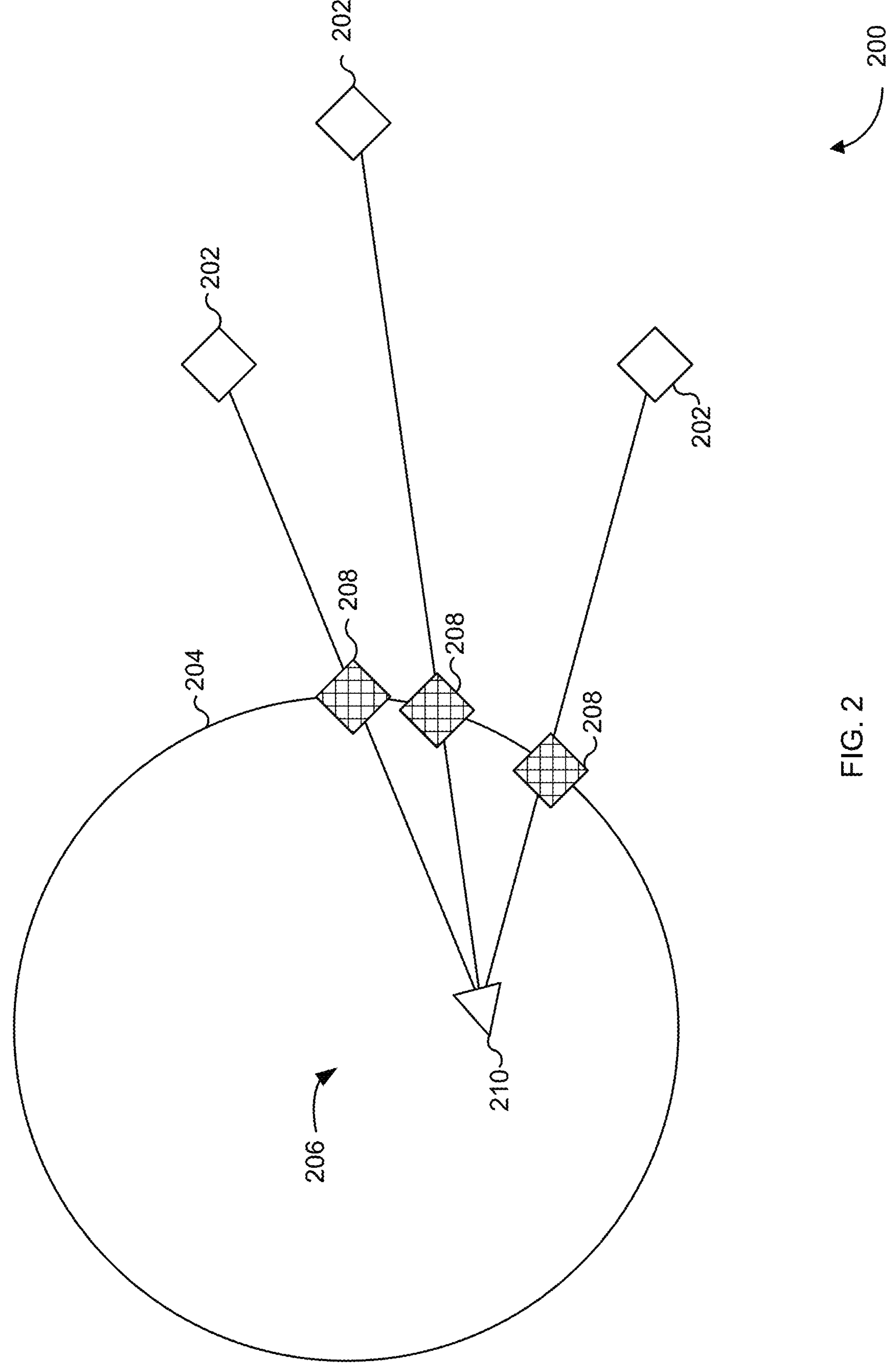
FIG. 2 shows an overhead perspective of a virtual scene rendered onto a display surface according to at least on embodiment.

FIG. 2 shows an overhead perspective of a virtual production studio 200 according to at least on embodiment. The virtual points 202 are rendered on a curved display surface 204 bordering a stage area 206. In some implementations, display surface 204 can include an array or ensemble of display panels where the array can include panels on the ceiling or floor of the virtual production studio or stage. Virtual points 202 can be rendered, as part of a virtual scene, by generating apparent virtual points 208 on display surface 204. Apparent virtual points 208 can be generated so that when display surface 204 is viewed from an estimated camera position 210, apparent virtual points 208 can be perceived as a virtual scene containing virtual points 202. The virtual scene containing virtual points 202 can form a virtual environment that can include characters and scenery. In some implementations, the virtual scene can be rendered on the entire display surface or a portion of the display surface. A further illustration of the projection is now provided.

Figure 3:
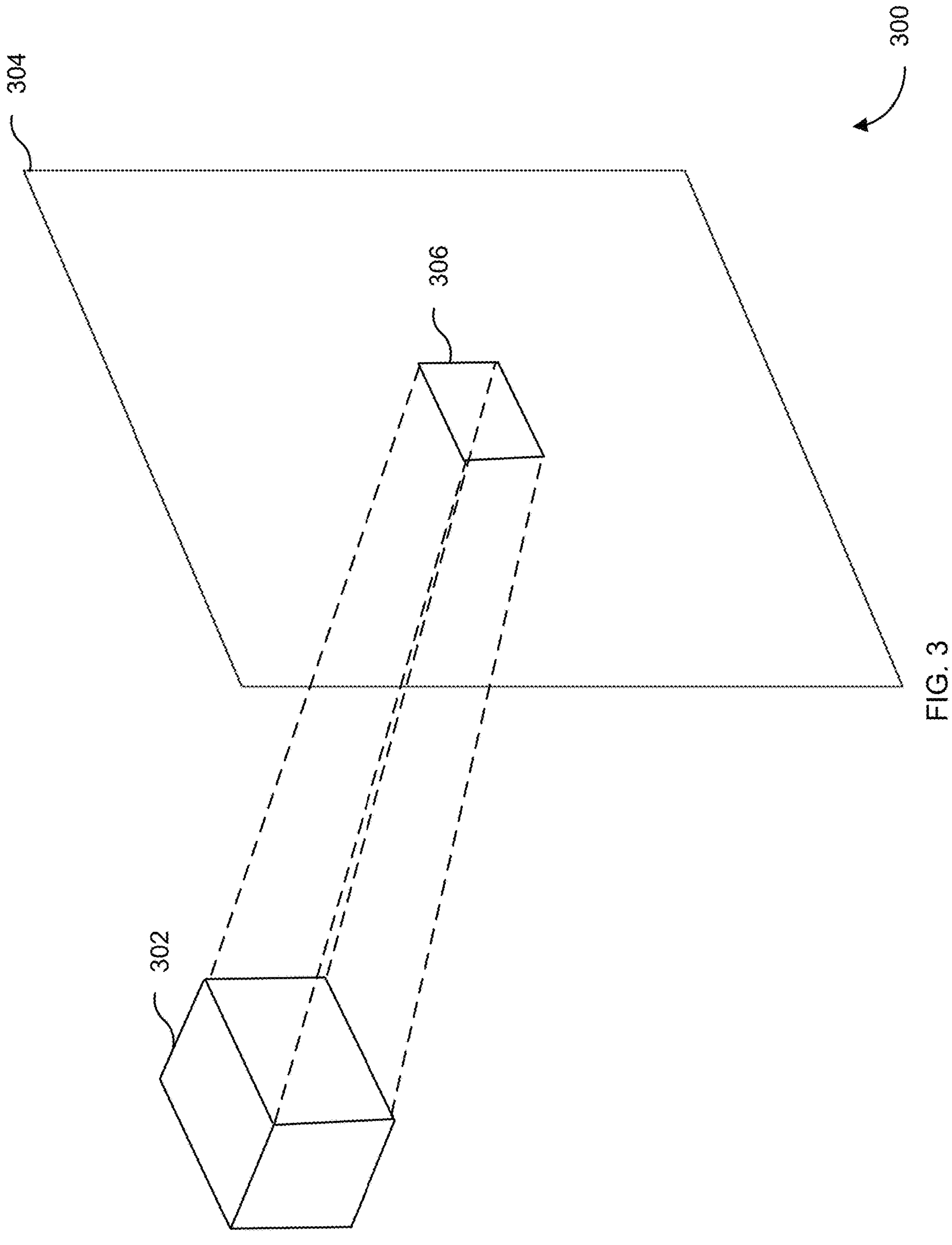
FIG. 3 shows a simplified diagram 300 of a projection of a three-dimensional object onto a two-dimensional plane according to at least on embodiment.

FIG. 3 shows a simplified diagram 300 of a projection of a three-dimensional object onto a two-dimensional plane (e.g., viewing surface) according to at least on embodiment. The three-dimensional object 302, a cube, can consist of virtual points in a virtual scene like virtual points 202 described above. Three-dimensional object can be projected onto a two-dimensional viewing plane 304 as a two-dimensional object 306. Two-dimensional viewing plane 304 can be a display surface in a virtual production studio like display surface 104 described above. Depending on the orientation of two-dimensional object 306 relative to two-dimensional viewing plane 304, a portion of three-dimensional object 302 that can be seen from two-dimensional viewing plane 304 is represented as two-dimensional object 306. Two-dimensional object 306 can be represented as a collection of apparent virtual points.

Referring back to FIG. 2, estimated camera position 210 can be estimated in various ways, as described herein. For example, the position of the camera at each time can be prescribed to be at a particular location or have a particular motion (choreographed). Such expected position can be used in conjunction with difference in an expected image and an actual image to determine an offset (also referred to as an error or difference) from the expected position. In another example, a machine learning model (e.g., neural network, etc.) can be trained using images taken at various positions for a given displayed image at a particular time. In this manner, the machine learning model can map an image taken at an instant in time to a position. A trajectory of the camera can also be determined, thereby allowing for a prediction of the next position as a time step.

II. Problems in Camera Tracking in a Virtual Production

Images shown on a virtual production studio's display surface can be distorted unless they are viewed from an estimated camera position (e.g., intended viewpoint). The estimated camera position can be the predicted physical camera position within a virtual production studio. A registration error is a discrepancy between the estimated camera position and the physical camera's actual position, and a registration error can result in distorted display panel images when the images are viewed from the physical camera's actual position.

Figure 4:
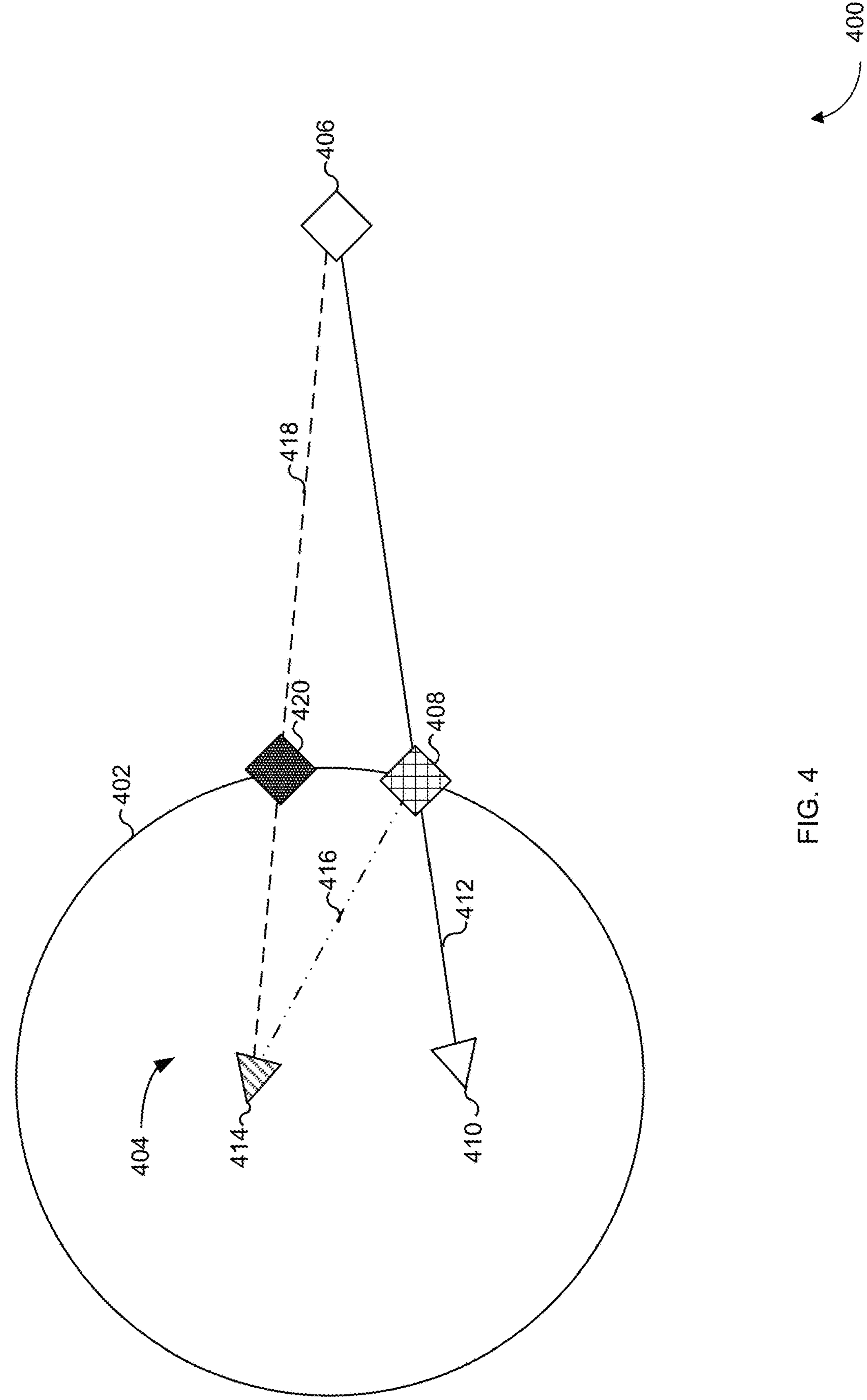
FIG. 4 shows an overhead perspective of a virtual production studio with a registration error according to at least on embodiment.

FIG. 4 shows a virtual production studio 400 with a registration error caused by a discrepancy between the actual line of sight and the proper line of sight according to at least on embodiment. Virtual production studio 400 includes a display surface 402 bordering a central stage area 404, similar to display surface 104 and central stage area 106 described above. A virtual point 406 forming part of a virtual scene is rendered as an apparent virtual point 408. Virtual point 406 is rendered with an intended viewpoint at predicted position 410 of the camera.

Apparent virtual point 408 is shown on display surface 402 along a line of sight 412 between predicted position 410 and virtual point 406. However, the physical camera 414 is not located at predicted position 410. An actual line of sight 416 extends from physical camera 414 to apparent virtual point 408. A proper line of sight 418 extends from physical camera to virtual point 406. Apparent virtual point 408 should have been rendered as a proper virtual point 420 in order to accurately show virtual point 406 from the viewpoint of physical camera 414. The difference between apparent virtual point 408 and proper virtual point 420 is the registration error.

To simulate a realistic environment, as the physical camera moves through the virtual production studio, objects in the computer generated environment as displayed on the display panels should move at different rates based on the object's virtual position relative to the physical camera. For example, as a physical camera traverses along an axis orthogonal to the camera's line of sight, close objects in the foreground images should move at a faster rate compared to distant background images (i.e., parallax). Additionally, when a physical camera moves along its line of sight, the relative size of foreground and background images should change with foreground images growing at a faster rate than background images.

Both the estimated camera position and actual camera position can be three-dimensional positions with six degrees of freedom and registration errors can occur because of a discrepancy between the expected and actual position along the physical camera's line of sight or on axes orthogonal to the line of sight. In some implementations, the display surface is larger than the visual field of the camera and the physical camera is able to rotate while filming the display screen. When the estimated camera position and actual camera position share a center of projection, rotational discrepancies between the estimated camera position and actual camera position do not cause registration errors as the estimated camera position and actual camera position are collocated.

The magnitude of registration errors depends on the distance between the virtual point (e.g., a point in the computer generated environment) and the apparent virtual point (e.g., a point on the display panel array depicting a virtual point). A virtual point that is collocated with the apparent virtual point will not appear distorted regardless of the registration error, because there is no parallax as the virtual point's apparent position and actual position are identical regardless of movement. However, as discussed above, distance between the virtual point and apparent virtual point can result in a registration error because the virtual point's apparent position can vary depending on the viewpoint.

The registration error's orientation can also contribute to image distortion with errors orthogonal to the line of sight causing larger distortions than registration errors along the line of sight. External camera tracking techniques are prone to orthogonal registration errors because such systems often include a ceiling mounted tracking camera or fiducial markers to determine the camera position. External markers on the physical camera are used by the tracking camera to determine the camera position using motion capture techniques. Generally, errors in external camera tracking occur along an axis between the tracking camera and the physical camera because the pictures used by the camera tracking system cannot easily determine the physical camera's depth relative to the tracking camera.

Figure 5A:
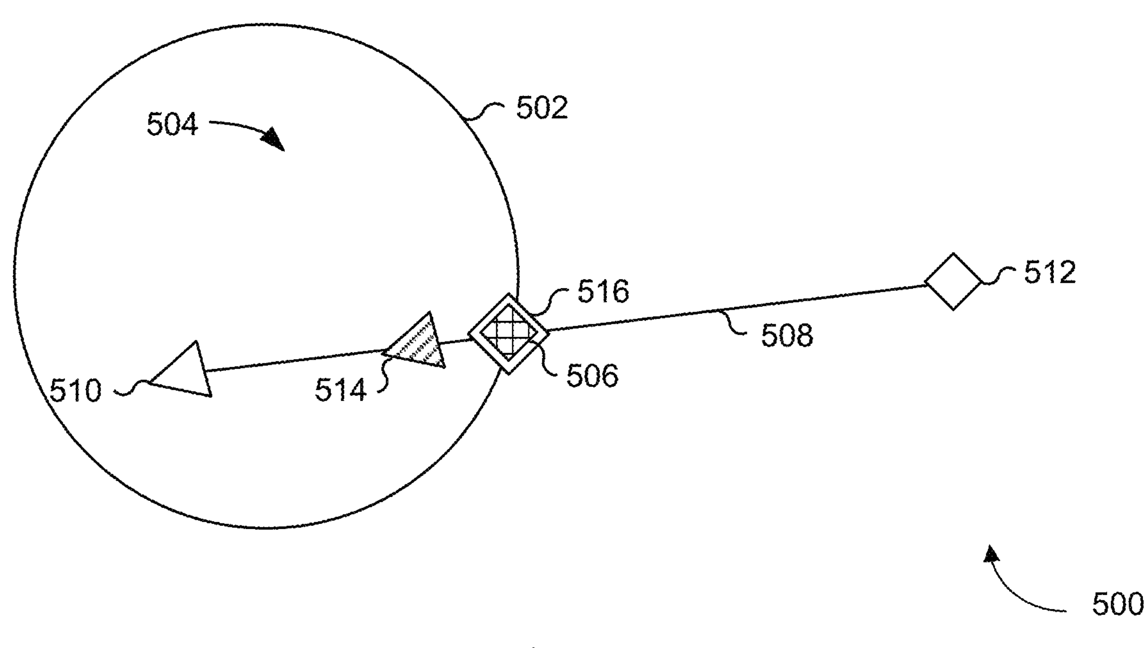
FIG. 5A shows an overhead perspective of a camera with a registration error along the line of sight according to at least on embodiment.

FIG. 5A shows a virtual production studio 500 with a discrepancy between the physical camera's expected position and actual position along the physical camera's line of sight according to at least on embodiment. The display surface 502 surrounds the central stage area 504 and the features described in relation to FIG. 5A are similar to related features described above. Apparent virtual point 506 was rendered along a line of sight 508 extending from the expected position 510 and the virtual point 512. The physical camera 514 is not located at expected position 510 and is instead located closer to apparent virtual point 506 along line of sight 508.

In this case the line of sight 508 and the proper line of sight are the same and apparent virtual point 506 and the proper virtual point 516 are located in close proximity, but the object represented by proper virtual point 516 is larger than the object represented by apparent virtual point 506. The registration error is the distance between the corresponding pixels of the objects constructed by apparent virtual point 506 and proper virtual point 516 and the registration error can be small. Registration error may be measured in pixels, virtual distance in the virtual environment, real-world distance in the real-world studio setting, or other units as may be convenient for the stakeholders or for the underlying game engine.

Figure 5B:
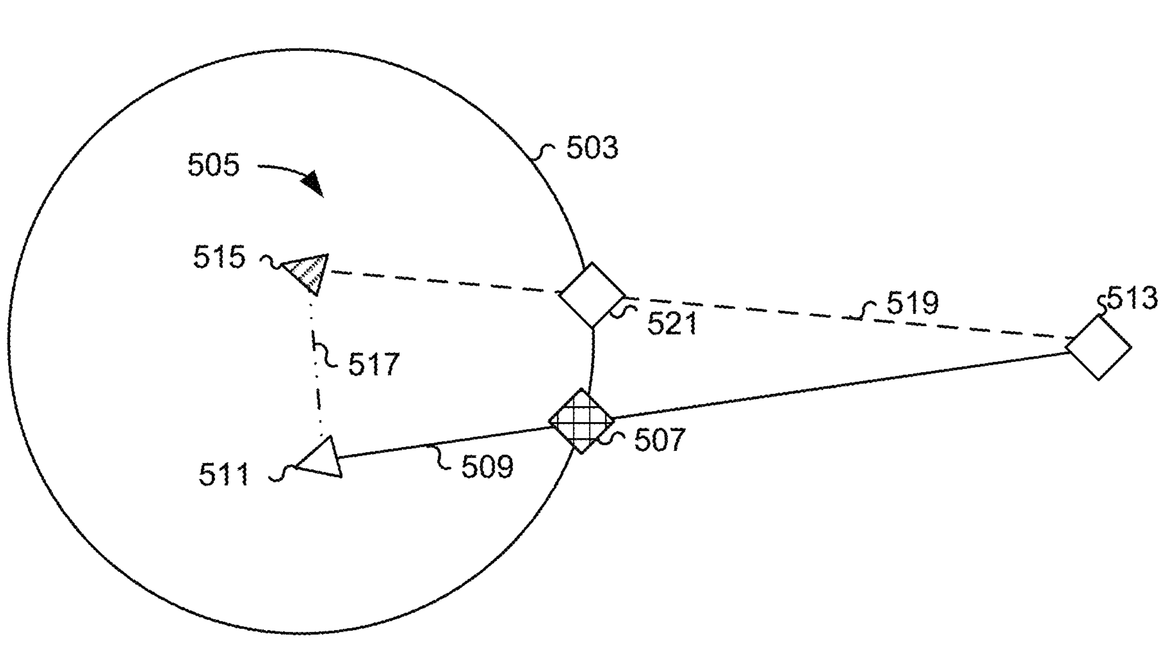
FIG. 5B shows an overhead perspective of a camera with a registration error orthogonal to the line of sight according to at least on embodiment.

FIG. 5B shows a virtual production studio 501 with a discrepancy between the physical camera's location and expected position along an axis orthogonal to the line of sight according to at least on embodiment. The features described in relation to FIG. 5B are similar to related features described above. A display surface 503 surrounds a central stage area 505 and an apparent virtual point 507 is displayed on display surface 503 along a line of sight 509 extending from an expected position 511 to a virtual point 513. The physical camera 515 is located along an axis 517 that is orthogonal to the line of sight 509. The proper axis 519 for physical camera 515 extends through a proper virtual point 521 to virtual point 513 and a registration error is caused by the difference between proper virtual point 521 and apparent virtual point 507.

Figure 6:
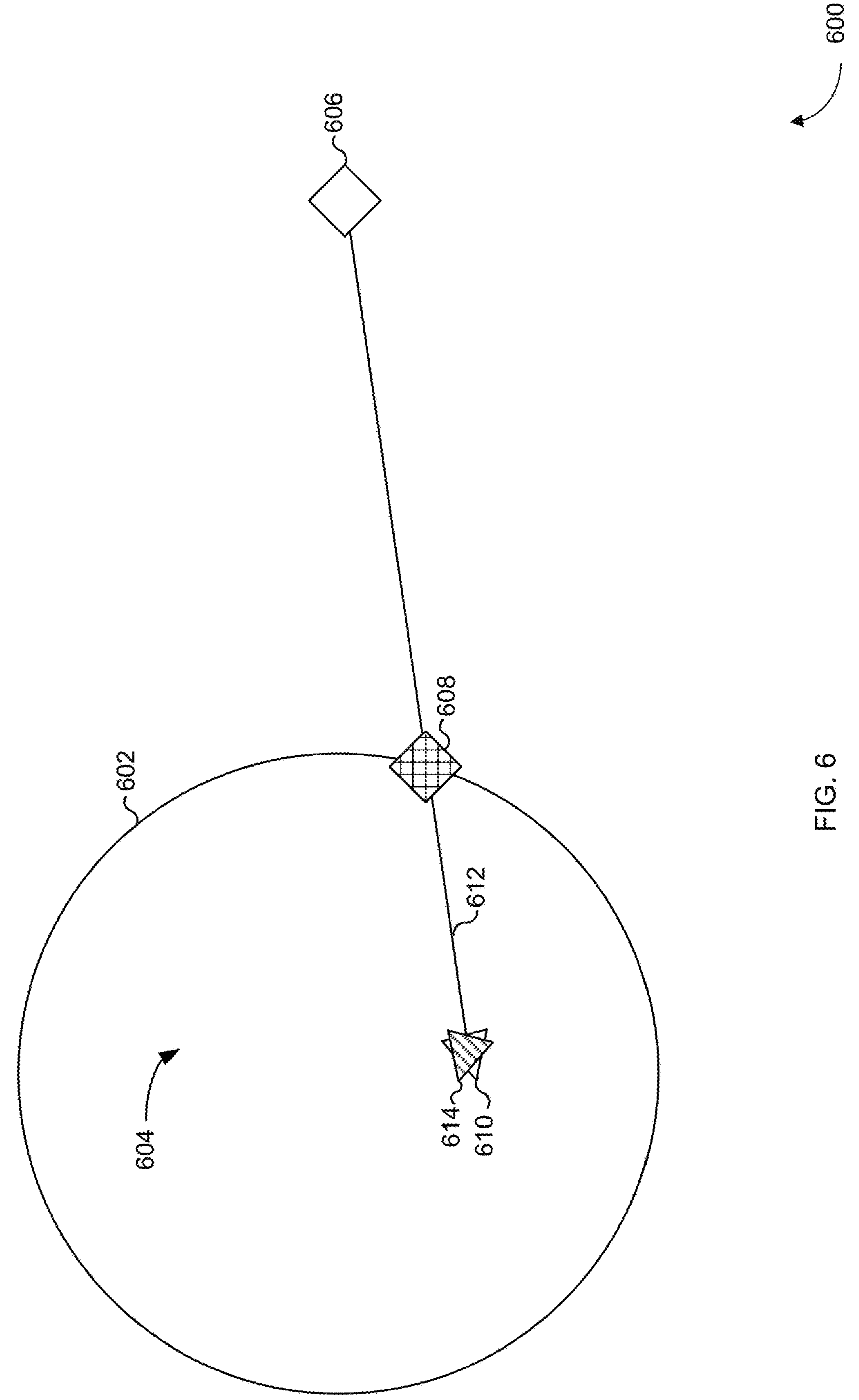
FIG. 6 shows an overhead perspective of a virtual production studio where the expected camera position and the actual camera position are collocated but where the cameras have different orientations according to at least on embodiment.

FIG. 6 shows an overhead perspective of a virtual production studio 600 where the physical camera is rotated around an axis extending from the floor to the physical camera relative to the expected position causing a rotation error according to at least on embodiment. The display surface 602 surrounds the central stage area 604 and an apparent virtual point 606 is shown on display surface 602 along an axis 612 between the virtual point 608 and the expected position 610. The physical camera 614 is located at the same position as expected position 610, but the orientation of physical camera 614 is rotated relative to the expected camera position. In some implementations, the scene is rendered on a portion of the display surface that is larger than the field of view for physical camera 614. In these implementations, physical camera 614 can rotate without registration errors because the apparent virtual point 606 and the proper virtual point can be collocated if the center of the projection is the same for expected position 612 and physical camera 614.

Such errors can be addressed using visual odometry. More specifically, the captured images taken by the physical camera can be compared to expected images if the camera was at a predicted position. The error between the images provides a positional offset relative to the predicted position, thereby providing a measure of the actual position or corrected position. This corrected position can be used to predict the position at the next time step.

III. Determination of Positions Using Odometry

Visual odometry is a process of determining the location and orientation of camera from sequential images. Visual odometry can be used to determine the three directional movement of a camera in an environment (e.g., Egomotion). The physical camera's position in an environment can be determined by mapping elements in a two-dimensional image to locations in the three-dimensional environment.

A. Visual Odometry

Visual odometry can be used to determine a camera's position in a three-dimensional environment by tracking changes in images captured with the camera. Features (information about the content of an image) can be detected in sequential camera images, and the features from the sequential images can be compared to determine the camera's movement.

Features can include naturally present characteristics such as edges, corners, or textures within an image. Tracking can be facilitated with easily identifiable features, called fiducials, that are added to a scene to assist tracking. Fiducials, also known as landmarks or markers, include point fiducials that generally are comprised of a 4-5 pixel wide point on a clear circular background. Alternatively, planar fiducials often consist of a black and white grid. Fiducials are useful for feature detection because the fiducial can be easy to identify because the fiducial contrasts highly with the background. Feature recognition can occur via object recognition techniques such as the techniques disclosed in U.S. Patent Publications No. 2021/0027084, No. 2019/0318195, or No. 2019/0272646 which are incorporated by reference in their entirety.

The movement of features in sequential images can be used to create an optical flow (e.g., the pattern of apparent motion of objects, surfaces, and edges in the sequential images caused by the camera's motion) by matching features between images. The optical flow (e.g., an optical flow created using the Lucas-Kanade method) can be used to estimate the camera motion using a Kalman filter for state estimation distribution maintenance. Camera motion can also be estimated by finding the geometric properties of the features that minimize a cost function based on the re-projection error between the two adjacent images (e.g., by mathematical minimization or random sampling).

As an example, the changes in the size of an object (i.e., getting smaller or larger) can indicate movement in a direction toward or away from the screen, along with the general shape staying the same. An apparent movement to the left (e.g., away from a direction perpendicular to the screen) can be determined by the object's width getting smaller, while the width of objects on the left side of the screen getting larger. Similar changes can be detected for movement to the right.

B. Mapping of Images to Positions

Visual odometry can be used to track a virtual production camera by comparing an image captured with the camera to a simulated image based on what should be seen if the camera was at a predicted position relative to the display surface. The system can determine the simulated (expected) image by using the predicted position to project (i.e., in the 3D model) the virtual scene onto the screen. The same predicted position that is used to determine the rendered image on the display screen can be used to determine the expected image of the display screen. As part of the comparison of the images, the corresponding virtual scenes can be determined, and those can be compared to determine an offset from the expected position or a mapping to a position.

1. 2D to 3D Tracking

Traditional feature visual odometry techniques can be used to determine a camera's location in a three-dimensional space from a two-dimensional image. A viewpoint (e.g., pose) can be determined using three-dimensional points in a virtual environment and points on a two-dimensional viewing plane (e.g., camera image) with the following formula:

$$u_i^t = \text{Project}(X_i, pose_t) \tag{1}$$

The projected points $$u_i^t$$

represent an ideal set of two-dimensional feature points on a viewing plane. The virtual points $X_i$ (e.g., virtual points 202) represent a set of three-dimensional points in a three-dimensional space (e.g., virtual scene). The variable $pose_t$ represents the ideal position of a camera at time t. If the two-dimensional feature points $$u_i^t$$

and the three-dimensional virtual points $X_i$ are known, the camera's location (e.g., viewpoint) $pose_t$ can be determined by finding a minimized value for $pose_t$ for the projection of the ideal two-dimensional feature points $$u_i^t$$

to the three-dimensional virtual points $X_i$ (e.g., a point where lines passing through $X_i$ and $$u_i^t$$

intersect).

Observed two-dimensional feature points $$\hat{u}_i^t$$

can be determined from the image captured by a physical camera. Then, the lines from the virtual points $X_i$ to the corresponding objects on the screen (i.e., $$\hat{u}_i^t)$$

will intersect at the viewpoint $pose_t$. Alternatively, a cost function can be minimized. The cost function can include the difference between the ideal projected points $$u_i^t$$

and the observed points $$\hat{u}_i^t$$

For example, the sum of the squares of the differences can be used as the cost function. As examples, the actual pose can be determined by using brute force methods to optimize the cost function, using a method of steepest descent approach, or by using other gradient methods.

Equation (1) can also be used to project three-dimensional virtual points $X_i$ onto a two-dimensional surface (e.g., in an image buffer) as two-dimensional points $$u_i^t.$$

If the three-dimensional points $X_i$ are known and the viewpoint $pose_t$ is known, the ideal two-dimensional points $$u_i^t$$

can be determined from equation (1).

In order to determine a camera's location in a virtual production studio, three-dimensional points (e.g., virtual points $X_i$) from the virtual scene can be projected onto the display panels as two-dimensional apparent virtual points $\hat{X}_i$. This can be done using a process described in equation (2). Keep in mind that while the apparent virtual points $\hat{X}_i$ on each panel have a two-dimensional position relative to the virtual scene, but once the apparent virtual points are rendered onto the panels, the points have a three-dimensional position within the virtual production studio. Once the apparent virtual points $\hat{X}_i$ are observed (as $$\hat{u}_i^t)$$

by capturing an image, the camera's actual location in the virtual production studio can be determined from the apparent virtual points three-dimensional location within the virtual production studio by capturing an image with a camera and minimizing a cost function as described above.

The apparent three-dimensional points can be projected onto the display surface (e.g., display surface 104) using the following formula:

$$X_i' = \text{Intersect\_with\_surface}(X_i, \text{rendered\_pose}_t) \tag{2}$$

The known virtual points $X_i$ (e.g., virtual points 406) and estimated position (rendered_pose$_t$) can be used to calculate the location of apparent virtual points $\hat{X}_i$ (e.g., apparent virtual points 408) on the display surface (e.g., display surface 402). The estimated position and virtual points $X_i$ are both used to provide images to the display surface, but the location of the apparent virtual points $\hat{X}_i$ on the two dimensional display surface is unknown. The apparent virtual point's location on the display surface can be calculated by finding a minimized value $\hat{X}_i$ for a cost function tracing a point where a line between the estimated position (rendered_pose$_t$) and the virtual points $X_i$ intersect with the panel array.

2. 3D to 2D Tracking

If the apparent virtual point's $\hat{X}_i$ three-dimensional positions in the virtual production studio is known, the physical camera's location can be determined using two-dimensional points $$\hat{u}_i^t$$

in a viewing plane (e.g., points captured with a camera) and the following formulae:

$$u_i^t = Project(\hat{X}_i, pose_t) \tag{3}$$

$$\text{actual\_pose}_t = \underset{pose_t}{\text{argmin}} \sum_i \|u_t^i - \hat{u}_i^t\| \tag{4}$$

$\hat{X}_i$ represents a set of three-dimensional apparent virtual points sent to the display panel;

$$\hat{u}_i^t$$

represents the location of an observed set of two-dimensional feature points in a viewing plane, where the viewing plane can be an image captured with a physical camera; and actual_pose$_t$ represents the physical camera's actual position in the virtual production studio. The three-dimensional location of the set of apparent virtual points $\hat{X}_i$ can be determined using the geometry of the display panel. The actual position actual_pose$_t$ can be determined by finding an actual position that minimizes the projection of the apparent virtual points $\hat{X}_i$ to the observed two-dimensional feature points $$\hat{u}_i^t$$

captured by the camera.

Correspondences between the observed two-dimensional points $$\hat{u}_i^t$$

and three-dimensional points $\hat{X}_i$ can be determined by comparing the observed image with a simulated image based on what should be seen if the camera was at a predicted position relative to the display surface. When computing the simulated image the 3D point of each pixel can be retained. This 3D information can correspond to the geometry of the panel, (for example point 408) not that of the virtual object. The features $$\hat{u}_i^t$$

can be matched with corresponding features in the simulated image, using an array of feature matching methods (e.g., SIFT) and thereby associate the 3D points $\hat{X}_i$.

Correspondences between the observed two-dimensional points $$\hat{u}_i^t$$

and three-dimensional points $\hat{X}_i$ can be also be maintained by tracking the location of observed two-dimensional feature points $$\hat{u}_i^t$$

from image to image to track a particular three-dimensional point $\hat{X}_i$. The correspondences can also be determined by matching two-dimensional features to three dimensional points using an object detection algorithm (e.g., scale-invariant feature transform (SIFT)). Further details on mapping images to positions can be found in Hartley, Richard, Zisserman, Andrew. Multiple view geometry in computer vision. United Kingdom: Cambridge University Press, 2003.

While the above tracking method is described in the context of feature matching it can also be described via image registration, or whole image alignment. In this case we search for a camera pose by iteratively rendering a simulated image and adjusting the pose of the camera such that the average difference between the simulated image and observed image is minimized.

3. Unknown Scene Geometry

In some implementations, the camera tracking system may not readily have direct access to the virtual geometry (e.g., points 406) nor the render pose (e.g., render pose 410) and the tracking algorithm can be completely isolated from the rendering system. For example, the tracking algorithm can be isolated from the rendering system if the rendered content needs to be protected. The camera tracking system may not have access to the rendering system if the camera tracking system itself is an isolated product and establishing a communication protocol is not possible. Isolating the tracking algorithm and rendering system may also be desirable to reduce communication latency between the systems. For example, the latency can be reduced if the estimation algorithms are built into the production camera.

A tracking system without access to the rendering system can estimate the camera pose from observed images, using a full simultaneous localization and mapping (SLAM) strategy tailored to the virtual production environment. Here we can optimize over not only the camera pose, actual_pose$_t$, but also the virtual points, $X_i$ and rendered_pose$_t$ using nonlinear optimization of the form:

$$\underset{X,render\_pose_t,actual\_pose_t}{\operatorname{argmin}} \left(\sum\nolimits_{i,t} \left\|u_t^i - \hat{u}_i^t\right\|\right) + \text{smoothness\_penalty}(\text{acutal\_pose}_{0 \ldots t}) + \text{smoothness\_penalty}(\text{render\_pose}_{0 \ldots t}) \tag{5}$$

Where:

$$u_i^t = \text{Project}(\text{Intersect\_with\_surface}(X_i, \text{rendered\_pose}_t),\ pose_t)$$

Smoothness_penalty can be a measure of the smoothness of camera motion over time such as acceleration, jerk, snap (see section V).

Optimization using (5) is similar to (3) and (4) in that we are using a model of the display surface to compute an intermediary apparent virtual point which is projected into a camera viewing plane (image buffer). However, in some circumstances we can simultaneously solve for the full system state. To help regularize the system we can constrain the camera motions (both render and actual) using a smoothness_penality.

Like other SLAM methods, camera state can be added to (5) over time, incrementally building up a map of the virtual points ($X_i$) from tracked features. Initial uncertainty around virtual structure ($X_i$) and camera motions can be high, but over time it can improve. We can maintain uncertainty estimates of the individual camera poses and virtual points, constraining the poses and virtual points and removing them from further optimization when their uncertainty falls below a threshold. We can also use loop closure strategies to prevent the creation of redundant virtual structure and reduce drift.

IV. Use of Odometry to Determine Projection of Next Scene

Visual odometry can determine the camera's current position after the scene has been rendered and displayed on the display surface. In order to minimize errors caused by a difference between the camera's estimated position and actual position, techniques are provided for predicting the camera's future position based on the camera's current position. The predicted position can be used to render scenes that are displayed on the display surface.

A. Determination of Errors Between Expected Position and Actual Position

Figure 7:
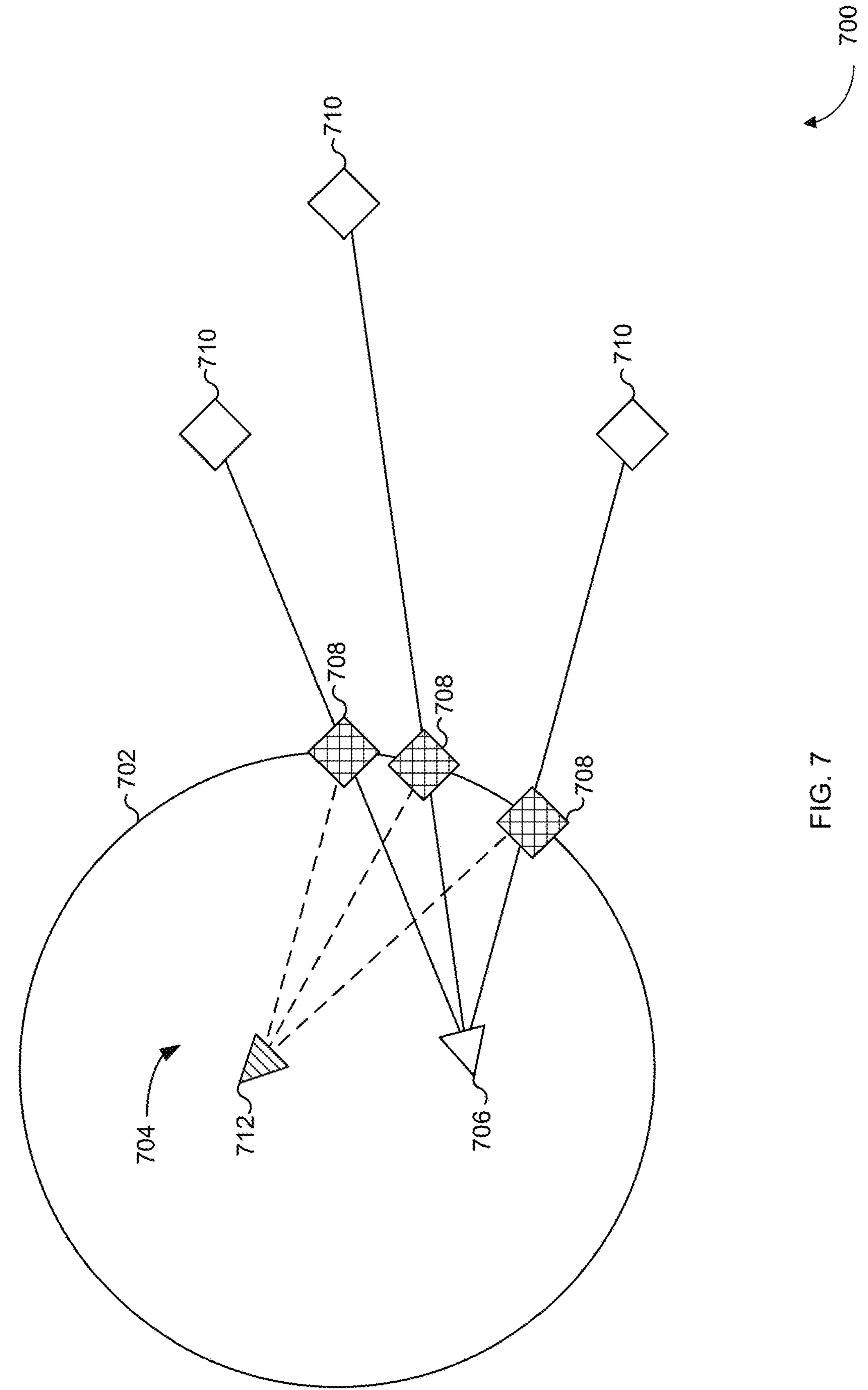
FIG. 7 shows an overhead perspective of a virtual production studio with a registration error according to at least on embodiment.

FIG. 7 shows an overhead perspective of a virtual production studio 700 with a registration error caused by a discrepancy between the estimated camera position and the actual camera position according to at least on embodiment. A display surface 702, bordering a central stage 704, shows a three-dimensional perspective projection of a virtual scene. When viewed from the estimated camera position 706, the two-dimensional images on display panel array 702 appear to be part of a three-dimensional computer generated environment.

In order to convey depth, the environment is rendered so that the images simulate light ray traces traveling from the virtual scene to the estimated camera position 706. The apparent virtual points 708, when viewed from estimated camera position 706, are indistinguishable from the virtual points 710. To accurately convey the path of light from virtual points 710 to the estimated camera position 706, the image formed by apparent virtual points 708 distort objects so that the two-dimensional display surface 702 appears to show depth (e.g., foreshortening). However, when apparent virtual points are viewed from the actual camera position 712, the image distortions are apparent because the simulated light ray traces do not converge at the actual camera position 712.

The equations described in section III including equations (2) and (3), can be used to determine actual camera position 712. The location of apparent virtual points on the display surface 708 (e.g., $\hat{X}_i$) can be determined by plugging virtual points 710 (e.g., $X_i$) and estimated camera position 706 into equation (2). Apparent virtual points 708, and two-dimensional points (e.g., $$\hat{u}_i^t)$$

from a camera image captured at actual camera position 712 can be plugged into equation (3) to determine the actual camera position (e.g., actual_pose$_t$).

B. Projecting Next Scene

The actual camera position, determined through visual odometry, can be used to identify an estimated position for the next scene at the next time period. A scene can be generated, with the estimated position as the intended viewpoint, and the scene can be projected to the panel array at the next time period.

Figure 8:
FIG. 8 shows a flowchart of a method for predicting a new camera position based on a previous camera position according to at least on embodiment.
Figure 8:
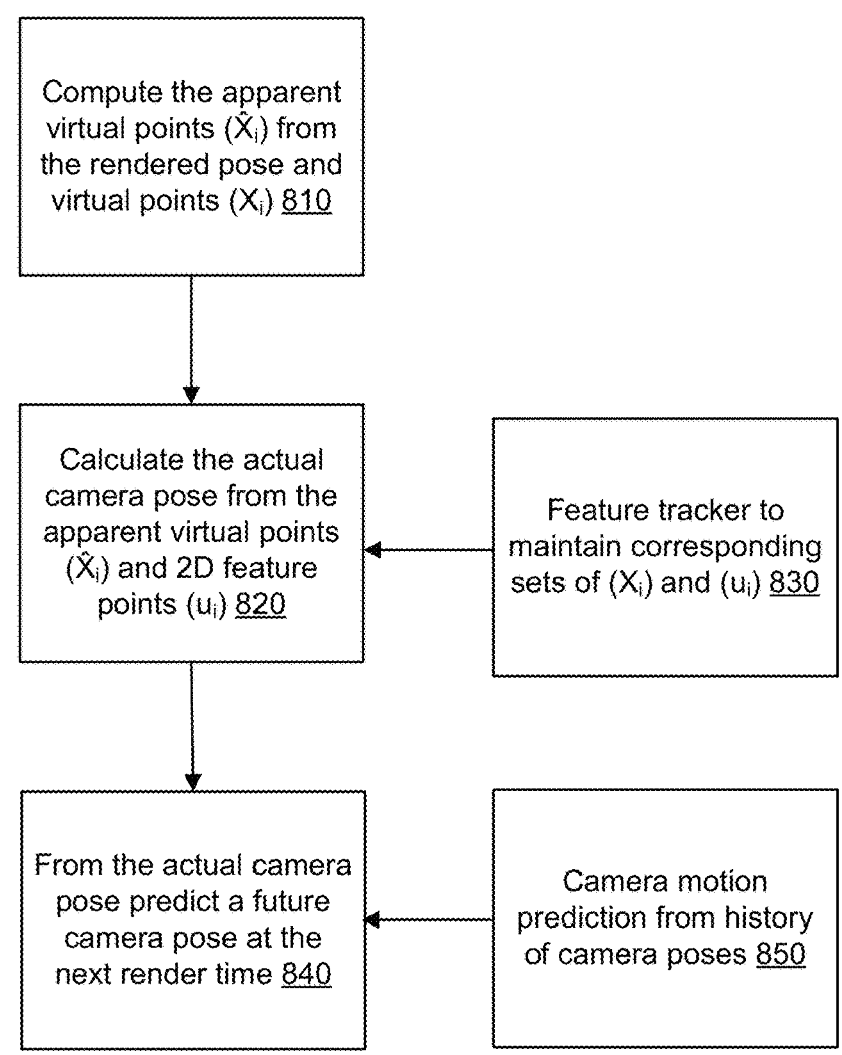

FIG. 8 shows a method 800 for predicting a future camera position from an actual camera position according to at least on embodiment. Predictions for the future camera pose can be optimized to reduce registration errors. A registration error can be the difference between the pixels in an expected image and the pixels in an actual image. The parameters of a prediction function can be optimized using training samples or even updated during a current session, e.g., until a convergence criteria is satisfied, such as within an error of one pixel or if the difference in pixels is less than a threshold number of pixels. The threshold number of pixels can depend on the distance between the display surface and the physical camera. A threshold number of pixels can increase as the distance between the physical camera and the display surface increases. In some implementations, an alarm can be triggered if the difference in pixels exceeds a threshold. The alarm can cause a calibration step such as a resync.

The product of the prediction function can be a floating point number that is stored by a computer system as a binary number. The binary number can be an approximation of the floating point number because there are an infinite possible floating point integers but a fixed quantity of binary numbers that can be stored in a given number of bits. For example, the value of ⅓ cannot be precisely stored in binary. When the floating point number cannot be precisely stored as a binary number, the floating point number can be rounded to a binary approximation. The difference between the floating point number and the binary approximation is a rounding error. In some implementations, if the magnitude of the registration error is less than the magnitude of the rounding error, the error will not trigger an alarm or cause a calibration step such as a resync.

At block 810, virtual points $X_i$ and estimated camera position rendered_pose$_t$ are used to compute apparent virtual points $\hat{X}_i$ on the display panel surface for a first time period. The apparent virtual points $\hat{X}_i$ can be calculated by plugging virtual points $X_i$ and estimated camera position rendered_pose$_t$ into equation (2). In some embodiments, the length of time between the first time period and a second time period could be the length of time between subsequent frames of the physical camera.

At block 820, the apparent virtual points $\hat{X}_i$ and feature points $$\hat{u}_i^t$$

are used to compute the actual camera position actual_pose$_t$ during the first time period. The actual camera position actual_pose$_t$ can be determined by the method disclosed in section III.B using virtual points $\hat{X}_i$ and feature points $$\hat{u}_i^t.$$

At block 830, in some implementations, a set of corresponding virtual and feature points can be established via the method described in section III.B.2 above. A feature tracker can then maintain the corresponding sets of virtual points $X_i$ and feature points $$\hat{u}_i^t.$$

The feature tracker can be used to help determine the actual camera position as described at block 820. The features tracker can be a two-dimensional image to image feature tracker (e.g., optical flow). The feature tracker can maintain two-dimensional to three-dimensional correspondences over time. The correspondences can be provided to the feature tracker as an initial set of correspondences. The feature tracker can store two-dimensional to three-dimensional correspondences as they are detected with an object detection algorithm (e.g., scale-invariant feature transform (SIFT)).

In some implementations, feature tracker data can be obtained by an initialization procedure that can occur after a scene has been rendered and sent to display surface but before filming occurs. The initialization process could include a camera, mounted on a robotic arm cycling through some or all of the positions pose$_t$ in the virtual production studio while the virtual scene is displayed on the panel array. The corresponding location for the feature points $$\hat{u}_i^t$$

captured by the physical camera would be known because the camera would have already obtained the feature points $$\hat{u}_i^t$$

and calculated the physical camera's position during initialization. After initialization, the physical camera's location can be obtained by locating the feature points $$\hat{u}_i^t$$

in a table maintained in the feature tracker.

In some implementations, actual camera pose can be learned by directly mapping observed images to camera poses. This can be accomplished by mounting the camera to a robotic arm and cycling through some or all of the possible positions and content on the display. Because the position of the camera mounted on the robot arm is known precisely a regressor such as a deep neural network, can learn a direct mapping between the captured images and camera poses.

At block 840, the actual camera position is used to predict the future camera position at the next render time. The future camera position can be predicted using sensor data provided by the virtual production camera or external sensors. For example, if the camera is traveling in a straight line with a known velocity, the future camera position can be calculated from the actual position and the difference between render times. In some implementations, higher order derivatives of position can be used to predict the cameras position at the next time period from sensor data.

At block 850, in some implementations, predicting a future camera position, at block 840, can include making a prediction based on the history of camera poses. Predicting positions can be based on the history of camera poses can be accomplished with a machine learning model and predicting positions is discussed in further detail below in section V.C.

V. Predicting Positions

Rendering scenes based on the camera's predicted position rather than its actual position can reduce registration errors caused by camera movement. Rendering a scene is not instantaneous and, when the camera is moving, a scene rendered based on the camera's current position will be out of date by the time the scene is sent to the panel array. Various techniques for predicting the physical camera's position can be used to reduce the registration errors caused by the physical camera's movement.

A. Predicting Positions with Movement Data

A physical camera's estimated position during the next time period can be predicted from the physical camera's movement rather than the physical camera's position during the previous time period. In some implementations, the physical camera's movement can be determined with sensors, such as an accelerometer, the camera's movement can also be determined with an external tracking system (e.g., Optitrack) or through the visual odometry techniques described herein. Sensor data can be combined with a history of the physical camera's movement and visual odometry to predict the physical camera's location. The physical camera's future position, during the next time period, can be determined by extrapolating from the physical camera's current position, velocity, and acceleration. Position can be calculated with the following equation:

$$\vec{r} = \vec{r}_0 + \vec{v}_0 t + \frac{1}{2}\vec{a}_0 t^2 \tag{6}$$

Where $\vec{r}$ is the final position vector, $\vec{r}_0$ is the initial position vector, and t is the time period between the initial position and final position. A vector representing the initial velocity $\vec{v}_0$ and a vector for acceleration $\vec{a}_0$ are also included. The vectors can be two-dimensional vectors or three-dimensional vectors.

Additionally, other higher order derivatives of position, such as jerk, the third order derivative, snap, the fourth order derivative, crackle, the fifth order derivative, and pop the sixth order derivative, can also be used to make precise predictions about the physical camera's future location. An equation for determining position from the first six derivatives of position is shown below:

$$\vec{r} = \vec{r}_0 + \vec{v}_0 t + \frac{1}{2}\vec{a}_0 t^2 + \frac{1}{6}\vec{J}_0 t^3 + \frac{1}{24}\vec{s}_0 t^4 + \frac{1}{120}\vec{c}_0 t^5 + \frac{1}{720}\vec{p} t^6 \tag{7}$$

In addition to the initial position, final position, initial velocity, and initial acceleration discussed above, the equation includes vectors for higher order derivatives of motion. The initial jerk is shown as $\vec{j}_0$ while the initial snap is shown as $\vec{s}_0$. The initial crack is shown as the vector $\vec{c}_0$ and the sixth order derivative, pop, is shown as a constant $\vec{p}$. Any practical number of derivatives may be used.

An equation for movement, like those discussed above, generally assumes six degrees of freedom for a three-dimensional space. A camera, floating in space, can move in a number of directions from an initial starting point. However, the camera is likely attached to a rig and predictions of the physical camera's movement can take into account how the camera rigging limits the physical cameras movement. By limiting the camera's possible movements, predictions about the camera's position can be made more rapidly and more accurately because only likely movements are considered when estimating position. For instance, the possible positions for the camera may be limited by the maximum height for the camera rig because the camera is not likely to be a location that the camera will have difficulty reaching.

In some implementations, the camera rigging can be designed to limit degrees of freedom to help improve the accuracy of predictions by standardizing the rigging's movements so that the camera's motion is easier to predict. The camera rig can also constrain the camera's movement to eliminate movement patterns that cause registration errors. For example, the camera rigging can restrict abrupt changes in direction. Predicting positions with choreography The physical camera's position can also be determined using the film choreography. In scripted films, the physical camera's position in the virtual production studio can be known prior to filming. The choreography can be stored as a choreographic file, possibly generated by a game engine, that is used to control the camera's movements, via a robotic rig, and to inform movement predictions. In some implementations, the scenes can be pre-rendered prior to filming to minimize latency with the pre-rendered scenes being sent to the panel array at times dictated by the choreography without the need for rendering virtual scenes during filming.

In some implementations, the choreographic file could contain a start point, an end point, and a desired path to follow. The path can include one or more positions along the desired path. In some implementations, there can be a timestamp for the start point, the end point, and the positions along the desired path. The positions can be specified by a curve (e.g., a time derivative) or by a position in a coordinate system (e.g., x, y, z Cartesian coordinates). In some implementations, the desired path can include instructions for the desired camera orientation (e.g., rotation) along the path. In some implementations, the choreographic file can be stored in binary, as an extensible markup language (XML) file, or as a JavaScript Object Notation (JSON) file.

In some implementations, a predicted camera position can be compared to the positions indicated in the choreographic file. A difference between the predicted camera position and the position indicated by the choreographic file can conveyed to a camera operator. The difference between the predicted position and the positions indicated in the choreographic file can be used to generate metrics for the camera operator. For instance, the score for the camera operator can indicate a number of times that a distance between the predicted position and the position indicated in the choreographic file exceeds a threshold.

The physical camera can be mounted on a robotic arm and controlled by a camera control system, rather than controlled by a human operator. A choreographic file could be generated using a human camera operator. The human operator could control a physical camera, tracked with an external tracking system or through visual odometry. As the human operator moves the camera, the positions can be recorded and added to a choreographic file. Once the choreographic file is prepared, the file can be provided to a computer controlled rigging and the camera's path can be replicated by the camera control system.

Because robotically controlled movements can be repeated precisely, a robotically controlled physical camera can be optimized prior to filming to minimize registration errors. A calibration sequence can be filmed with the physical camera movements controlled by a choreographic file. The footage filmed during the calibration sequence can be compared the rendered images to determine any registration errors. In some circumstances, the scenes can be re-rendered to minimize any registration errors observed during the calibration sequence.

The rendering system and camera control system can also communicate to minimize registration errors. If, during the calibration sequence, the rendering system determines that the registration errors cannot be reduced by re-rendering the scene, the rendering system can inform the camera control system that the predetermined choreographic file is causing registration errors. The rendering system can also indicate the time periods in the predetermined choreographic file where the registration errors are occurring. In response, the camera control system can notify the filmmaker that the predetermined choreographic file at the indicated time periods is causing registration errors so that the filmmaker can take corrective action. In some implementations, the camera control system can take corrective action to reduce registration errors (e.g., the camera control system can turn an abrupt change in direction to a smooth turn).

B. Predicting Positions with a Machine Learning Model

A machine learning model can be trained to determine the camera's position at the next time period based on the camera's current state information. Training a machine learning model can include training an algorithm to classify input data (e.g., state information). In this case, classifying input data can mean providing a final position for the camera in a two-dimensional or three-dimensional coordinate system, where the origin point is the camera's initial location. During training, training data (e.g., data with known classifications, etc.) can be input into the algorithm. Output from the algorithm can be monitored and, if the data is not classified appropriately, the algorithm's weights can be varied until output's classifications match the training data's labels. Once the algorithm has been trained, the model can be used to classify data with unknown classifications.

In one implementation, the model can be trained on training data that includes current state information, such as a starting position, a starting velocity, and a starting acceleration. The training data can be represented as an n-dimensional vector, called a feature vector, that describes the input data. The input to the model can also include the time period between the initial state and the final state as an input, and the training data can be labeled with the final position relative to the starting position. After training the model should be able to receive state information as an input and the model should provide a final position, relative to the staring position, as an output.

In some implementations, the input data could also include a label for the camera operator controlling the virtual production camera. The model could be trained to provide predicted estimated positions for individual camera operators based on the camera operator's idiosyncrasies. Additionally, the camera operator's performance can be evaluated during filming. For example, the camera operator can be given a score for how many registration errors occurred while that camera operator was controlling the camera.

In some implementations, a predetermined choreographic file can be used as an input to train an algorithm to produce a machine learning model according to the technique describe above. The trained model could be used to identify movements in the predetermined choreographic file that are likely to produce registration errors. The training data used to train the algorithm can include past predetermined choreographic files with the choreography divided into estimated positions. The training data can also include a label for estimated positions indicating whether a registration error was observed. Unlabeled choreographic files be input into the trained model to identify choreographed moves that are likely to result in registration errors. A flag can be raised on estimated positions so that the choreography can be adjusted prior to filming.

VI. Visual Odometry for Training Simulations

The techniques described herein are not limited to filmmaking applications. The visual odometry camera tracking techniques can be used in various applications including immersive training simulations.

In some implementations, the techniques in this disclosure can be used for training simulations. For instance, in an airplane flight simulator, the display surface can include display panels that simulate the airplane's windows. A camera, mounted on a helmet or glasses, can be used to determine a render pose, the trainee's viewpoint, through visual odometry. Because the virtual scene shown on the display panels changes with the trainee's position, the training allows for immersive movements that are difficult with a static screen (e.g., leaning over to check a blind spot in a vehicle).

More than one trainee could be accommodated if the physical camera, used for visual odometry, is mounted in polarized glasses with the individual trainee's glasses having a different polarizations. Several virtual scenes could be shown simultaneously on the display surface with the several virtual scenes having different polarities so that the trainees, through their polarized glasses, can see a virtual scene rendered based on the trainee's viewpoint.

VII. Flowchart

Figure 9:
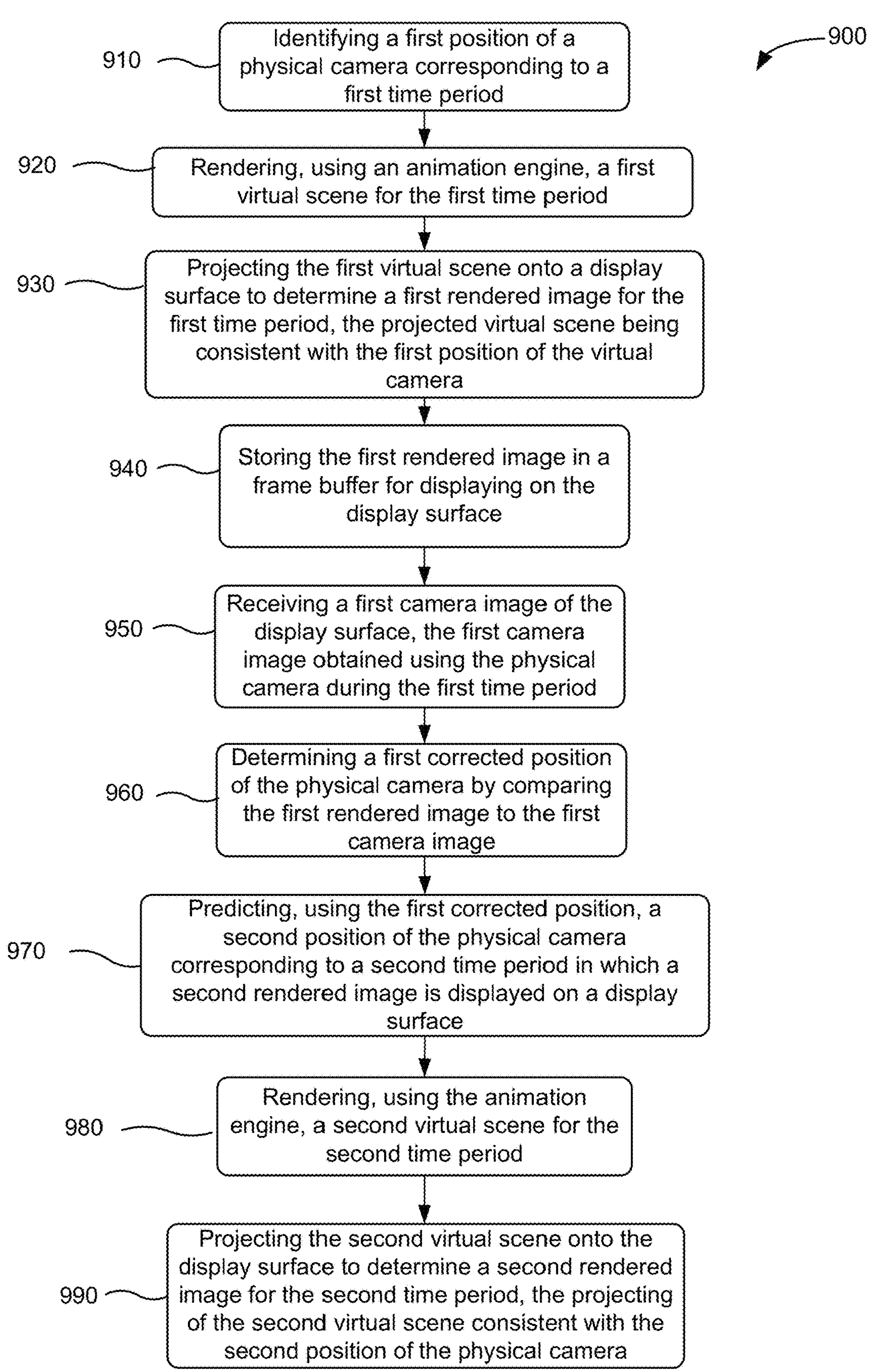
FIG. 9 shows a flowchart of a technique for implementing camera tracking in a virtual production environment according to at least on embodiment.

FIG. 9 is a flowchart of an example process 900 for implementing camera tracking in a virtual production environment according to at least on embodiment. The method can be performed by a computer system communicably coupled with a physical camera that is movable.

At block 910, a first position of a physical camera corresponding to a first time period is identified. The first position of the physical camera can be identified using an initial image from the physical camera of the display screen. In some implementations, the first position can be determined using an external tracking system. In other implementations, the first position of the physical camera can be identified from a predetermined choreographic file. In some implementations, the display screen can present a set of fiducials prior to the first time period to assist in determining the first position. The time period can be the length between subsequent frames filmed with the physical camera.

In some embodiments, the first position could be identified through a specific measurement with a tracking system or through visual odometry. In other examples, the first position could be identified by a predicting the first position (e.g., using a machine learning model), or the first position could be identified because the location of the first position is specified. For example, the first position could be specified in a predetermined choreographic file.

At block 920, a virtual scene is rendered for the first time period using an animation engine. The virtual scene can be a static image, such as empty scenery, or a dynamic image, such as a crowded intersection with pedestrians. The time period can be related to the camera's frame rate and, in some circumstances, the camera's frame rate can be increased or decreased to correct for artifacts captured during filming. The animation engine can be a game engine designed for the development of video games such as Unreal Engine, Unity, or other game engine.

At block 930, the virtual scene is projected onto a display surface to determine a first rendered image for the first time period. The projected virtual scene can be consistent with the first position of the physical camera. The display surface can be an array of display panels including light-emitting diode (LED) panels, organic light-emitting diode (OLED) panels, liquid crystal display (LCD) panels, etc.

At block 940, the first rendered image is stored in a frame buffer for displaying on the display surface. The frame buffer can be a fixed memory location in physical storage medium or a virtual data buffer implemented in software. The rendered image can be displayed on the display surface in the virtual production studio, and, in some implementations, the rendered image can be displayed on some or all of the display surface.

At block 950, a first camera image of the display surface is received. The first camera image was obtained using the physical camera during the first time period. In some implementations, the physical camera can include one or more cameras. For instance, the physical camera can comprise a film camera, for recording the scene, and a position camera, for capturing the first camera image. In some implementations, the position camera could be a 360 degree camera or array of cameras. In implementations where the physical camera includes multiple cameras, the rendered scene can include fiducials that are rendered outside of the view of the film camera and within the view of the position camera. For instance, the virtual scene could be rendered on a half of the display surface bordering the film camera's intended field of view, while fiducials could be rendered on the other half of the display surface.

At block 960, a first corrected position of the physical camera is determined by comparing the first rendered image to the first camera image. The first rendered image and the first camera image can be compared by identifying features in both images and determining any features that the two images have in common. The relative movement of the features can be used to determine how the camera's orientation and position has changed relative to the display surface.

At block 970, a second position of the physical camera corresponding to a second time period is predicted using the first corrected position. During the second time period, the second rendered image is to be displayed on a display surface. In various embodiments, film predetermined choreographic file can be used to predict the second position. In some implementations, the second position can be predicted using a trained machine learning model where the camera operator, the choreography, the history of camera positions, and sensor data can be inputs to the machine learning model.

At block 980, a second virtual scene is rendered for the second time period. The second virtual scene can be rendered using the animation engine. The second virtual scene can be rendered where the intended viewpoint for the second rendered scene is the second position of the physical camera. In some implementations, more than one separate physical camera can be used to film the same scene. For example, the cameras can be arranged to film a scene with the lines of sight for the two cameras orthogonal to each other. A choreographic file can dictate which physical camera, of the more than one physical cameras, is being used for a given time period. The physical cameras' locations can be tracked, even when the camera is not in use, and the scene can be rendered for the different cameras as needed.

At block 990, the second virtual scene is projected onto the display surface to determine a second rendered image for the second time period. The projection of the second virtual scene being consistent with the second position of the virtual camera.

Process 900 may include additional implementations, such as any single implementation or any combination of implementations described below and/or in connection with one or more other processes described elsewhere herein.

In some implementations, process 900 includes identifying the first position of the physical camera by storing a model that maps images to physical positions and inputting the initial images into the model.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

VIII. Computer System

Figure 10:
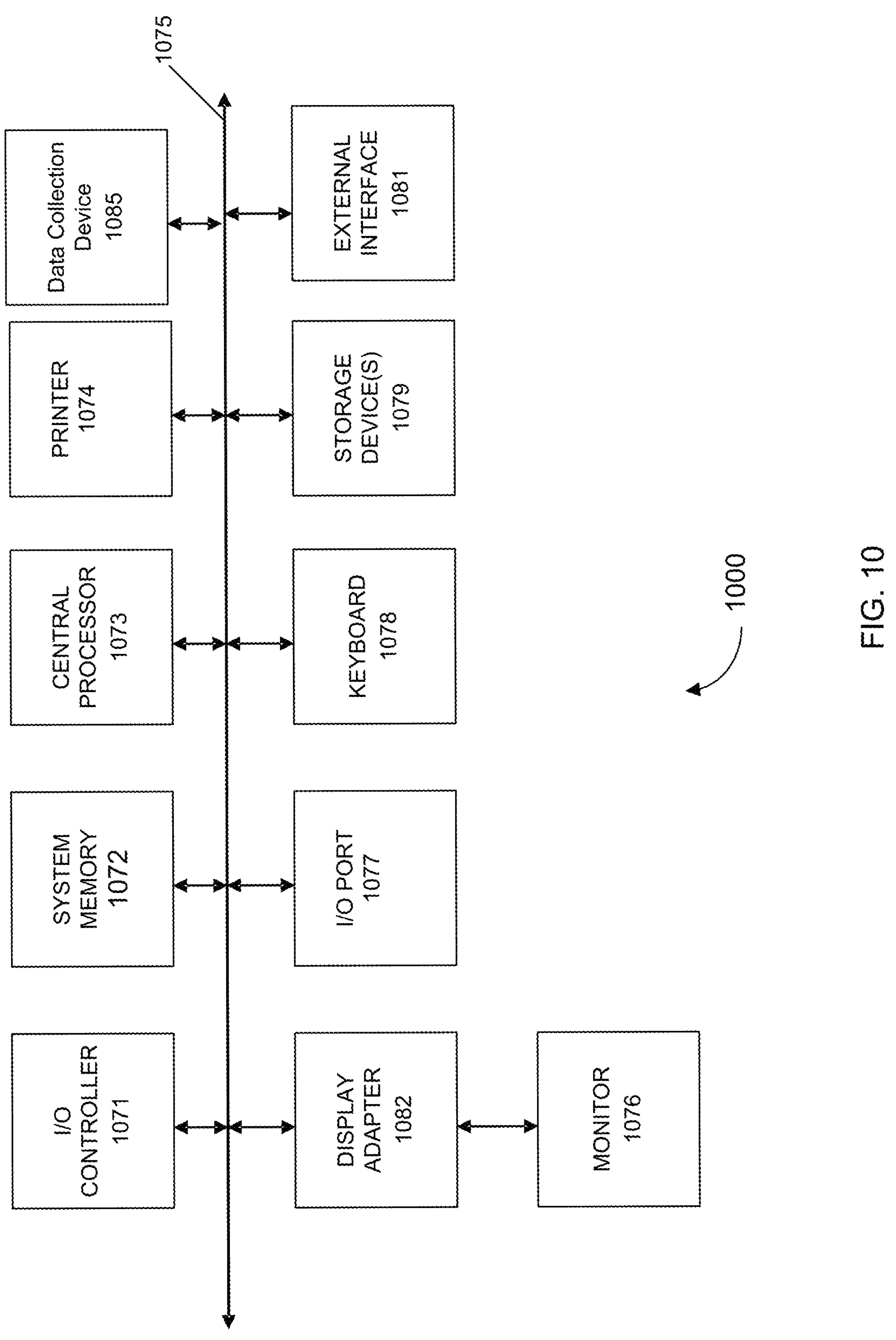
FIG. 10 shows a diagram of an example computer system according to an embodiment of the present disclosure according to at least on embodiment.

Any of the computer systems mentioned herein may utilize any suitable number of subsystems. Examples of such subsystems are shown in FIG. 10 in computer system 1010. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 10 are interconnected via a system bus 1075. Additional subsystems such as a printer 1074, keyboard 1078, storage device(s) 1079, monitor 1076 (e.g., a display screen, such as an LED), which is coupled to display adapter 1082, and others are shown. Peripherals and input/output (I/O) devices, which couple to I/O controller 1071, can be connected to the computer system by any number of means known in the art such as input/output (I/O) port 1077 (e.g., USB, FireWire®). For example, I/O port 1077 or external interface 1081 (e.g. Ethernet, Wi-Fi, etc.) can be used to connect computer system 1010 to a wide area network such as the Internet, a mouse input device, or a scanner. The interconnection via system bus 1075 allows the central processor 1073 to communicate with each subsystem and to control the execution of a plurality of instructions from system memory 1072 or the storage device(s) 1079 (e.g., a fixed disk, such as a hard drive, or optical disk), as well as the exchange of information between subsystems. The system memory 1072 and/or the storage device(s) 1079 may embody a computer readable medium. Another subsystem is a data collection device 1085, such as a camera, microphone, accelerometer, and the like. Any of the data mentioned herein can be output from one component to another component and can be output to the user.

A computer system can include a plurality of the same components or subsystems, e.g., connected together by external interface 1081, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software stored in a memory with a generally programmable processor in a modular or integrated manner, and thus a processor can include memory storing software instructions that configure hardware circuitry, as well as an FPGA with configuration instructions or an ASIC. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method for implementing camera tracking in a virtual production environment, the method comprising performing, by a first physical camera and a second physical camera, wherein the first physical camera and the second physical camera are movable:

identifying first positions of the first physical camera and the second physical camera, wherein the first positions correspond to a first time period;

rendering, using an animation engine, a first virtual scene for the first time period;

projecting the first virtual scene onto a display surface to determine a first rendered image for the first time period, the projecting of the first virtual scene consistent with the first positions of the first physical camera and the second physical camera;

storing the first rendered image in a frame buffer for displaying on the display surface;

receiving a first camera image of the display surface, the first camera image obtained using the second physical camera during the first time period;

measuring a movement of the first physical camera during the first time period;

determining a first corrected position of the second physical camera based at least in part on the movement of the first physical camera;

predicting, using the movement of the first physical camera and the first corrected position, second positions of the first physical camera and the second physical camera, wherein the second positions correspond to a second time period in which a second rendered image is to be displayed on the display surface;

rendering, using the animation engine, a second virtual scene for the second time period; and projecting the second virtual scene onto the display surface to determine the second rendered image for the second time period, the projecting of the second virtual scene consistent with the second positions of the first physical camera and the second physical camera.

2. The method of claim 1, further comprising:

receiving a second camera image of the display surface, the second camera image obtained using the second physical camera during the second time period; and comparing the second camera image and the second rendered image to determine a registration error of the second physical camera.

3. The method of claim 2, further comprising:

comparing the registration error to a threshold;

in response to the registration error exceeding the threshold, re-rendering, using the animation engine, the second virtual scene for the second time period; and projecting the second virtual scene onto the display surface.

4. The method of claim 1, wherein the movement of the first physical camera is determined by an estimation algorithm that is executing on a processor of the first physical camera.

5. The method of claim 4, further comprising:

updating parameters of the estimation algorithm until a registration error is below a threshold.

6. The method of claim 5, wherein the threshold increases as a distance between the first physical camera and the display surface increases.

7. The method of claim 1, wherein the movement of the first physical camera is determined from a predetermined choreographic file for a final video that is to be obtained.

8. A computer product comprising a non-transitory computer readable medium storing a plurality of instructions that when executed control a computer system to perform:

identifying first positions of a first physical camera and a second physical camera, wherein the first positions correspond to a first time period;

rendering, using an animation engine, a first virtual scene for the first time period;

projecting the first virtual scene onto a display surface to determine a first rendered image for the first time period, the projecting of the first virtual scene consistent with the first positions of the first physical camera and the second physical camera;

storing the first rendered image in a frame buffer for displaying on the display surface;

receiving a first camera image of the display surface, the first camera image obtained using the second physical camera during the first time period;

measuring a movement of the first physical camera during the first time period;

determining a first corrected position of the second physical camera based at least in part on the movement of the first physical camera;

predicting, using the movement of the first physical camera and the first corrected position, second positions of the first physical camera and the second physical camera, wherein the second positions correspond to a second time period in which a second rendered image is to be displayed on the display surface;

rendering, using the animation engine, a second virtual scene for the second time period; and projecting the second virtual scene onto the display surface to determine the second rendered image for the second time period, the projecting of the second virtual scene consistent with the second positions of the first physical camera and the second physical camera.

9. The computer product of claim 8, further comprising:

receiving a second camera image of the display surface, the second camera image obtained using the second physical camera during the second time period; and comparing the second camera image and the second rendered image to determine a registration error of the second physical camera.

10. The computer product of claim 9, further comprising:

comparing the registration error to a threshold;

in response to the registration error exceeding the threshold, re-rendering, using the animation engine, the second virtual scene for the second time period; and projecting the second virtual scene onto the display surface.

11. The computer product of claim 8, wherein the movement of the first physical camera is determined by an estimation algorithm that is executing on a processor of the first physical camera.

12. The computer product of claim 11, further comprising:

updating parameters of the estimation algorithm until a registration error is below a threshold.

13. The computer product of claim 12, wherein the threshold increases as a distance between the first physical camera and the display surface increases.

14. The computer product of claim 8, wherein the movement of the first physical camera is determined from a predetermined choreographic file for a final video that is to be obtained.

15. A system comprising:

a first physical camera and a second physical camera;

a non-transitory computer readable medium; and one or more processors communicably coupled with the non-transitory computer readable medium and configured to perform:

identifying first positions of the first physical camera and the second physical camera, wherein the first positions correspond to a first time period;

rendering, using an animation engine, a first virtual scene for the first time period;

projecting the first virtual scene onto a display surface to determine a first rendered image for the first time period, the projecting of the first virtual scene consistent with the first positions of the first physical camera and the second physical camera;

storing the first rendered image in a frame buffer for displaying on the display surface;

receiving a first camera image of the display surface, the first camera image obtained using the second physical camera during the first time period;

measuring a movement of the first physical camera during the first time period;

determining a first corrected position of the second physical camera based at least in part on the movement of the first physical camera;

predicting, using the movement of the first physical camera and the first corrected position, second positions of the first physical camera and the second physical camera, wherein the second positions correspond to a second time period in which a second rendered image is to be displayed on the display surface;

rendering, using the animation engine, a second virtual scene for the second time period; and projecting the second virtual scene onto the display surface to determine the second rendered image for the second time period, the projecting of the second virtual scene consistent with the second positions of the first physical camera and the second physical camera.

16. The system of claim 15, further comprising:

receiving a second camera image of the display surface, the second camera image obtained using the second physical camera during the second time period; and comparing the second camera image and the second rendered image to determine a registration error of the second physical camera.

17. The system of claim 16, further comprising:

comparing the registration error to a threshold;

in response to the registration error exceeding the threshold, re-rendering, using the animation engine, the second virtual scene for the second time period; and projecting the second virtual scene onto the display surface.

18. The system of claim 15, wherein the movement of the first physical camera is determined by an estimation algorithm that is executing on a processor of the first physical camera.

19. The system of claim 18, further comprising:

updating parameters of the estimation algorithm until a registration error is below a threshold.

20. The system of claim 19, wherein the threshold increases as a distance between the first physical camera and the display surface increases.

* * * * *